UNITED STATES PATENT OFFICE.

JOHN J. CROOKE, OF SOUTHFIELD, AND LEWIS CROOKE, OF NEW YORK, N. Y.

IMPROVEMENT IN COATING LEAD ARTICLES WITH TIN.

Specification forming part of Letters Patent No. 204,297, dated May 28, 1878; application filed March 9, 1878.

*To all whom it may concern:*

Be it known that we, JOHN JEREMIAH CROOKE, of Southfield, in the county of Richmond and State of New York, and LEWIS CROOKE, of the city, county, and State of New York, have made an invention of certain new and useful Improvements in the Art of Coating Lead and its Alloys with Tin; and that the following is a full, clear, and exact description and specification of the same.

This invention consists of the improvement in the art of coating lead and its alloys with metallic tin by treating the lead articles with an acid solution of tin.

The lead articles to be plated may be any which it is desirable to coat with metallic tin, such, for example, as lead-foil, sheet-lead, lead pipes, balls, and shot, the last of which generally contains arsenic; and the coating may be effected by treating such articles with the acid solution hereinafter described by steeping them in it with or without agitation.

The acid solution of tin which we prefer is a solution of the protochloride of tin acidulated with either nitric acid or hydrochloric acid; and, when the latter acid is employed as the acidulator, we have found it expedient to add a salt of some alkaline base to the solution.

The acid solutions which we have used with the best success are made of the following ingredients, and in the following proportions, the quantity prepared at any one time being varied as found expedient:

First, one pound of crystallized protochloride of tin is dissolved in one quart of water, with the addition of a sufficient quantity of hydrochloric acid (commercial) to prevent the precipitation of the basic salt of tin from the solution—say from one ounce to two ounces of said acid. A second solution is prepared by dissolving in two quarts of water at the mean atmospheric temperature—say 70° Fahrenheit—a sufficient quantity of bitartrate of potash to saturate the same, such quantity being about half a pound. The said two solutions, made of materials in the above proportions, are mixed together, and the mixture is diluted to produce the acid solution of tin for use by adding to each gallon of the mixture four gallons of water acidulated with four and a half ounces of nitric acid, (commercial.)

Second, one pound of protochloride of tin (crystallized) dissolved in one quart of water, and the solution is diluted with eight gallons of water acidulated with three-quarters of a pound of nitric acid, (commercial.)

Third, one pound of protochloride of tin is dissolved in one quart of water, and the solution is diluted with eight gallons of a saturated solution (cold) of bitartrate of potash in water acidulated with half a pound of hydrochloric acid, (commercial.) The solution of bitartrate of potash contains about one pound of bitartrate for the eight gallons of water.

Fourth, one pound of protochloride of tin is dissolved in one quart of water, and the solution is diluted with eight gallons of a solution of the chloride of sodium in water acidulated with half a pound of hydrochloric acid. The solution of the chloride of sodium contains two pounds of the chloride to the eight gallons of water.

The lead articles to be treated should either be clean, or should be cleansed of any lead oxide, dirt, and grease which may be upon their surfaces. The lead oxide on their surfaces may be removed by steeping them in weak nitric acid. The clean articles are placed in a wooden vessel, and a sufficient quantity of the solution is added to cover them with it. A coating of tin deposits upon them from the solution, and the process is completed in from five to ten minutes, according to the thickness of coating or plating required.

In operating with the acid tin solutions above described by me, care should be taken that the solution is not milky in appearance, nor does not become so when applied to the lead articles. If the solution should be milky when made, it is an evidence that more acid should be added to it.

If the solution becomes milky when in contact with the lead articles, it is an evidence that more of the solution should be used, as well as more acid, the practical effect of the free acid in the solution while the lead articles are steeped in it being the prevention of the precipitation of the chloride of lead.

The solution most expedient for any particular lot of articles may be readily found by commencing the treatment with the compound solution first described, and then varying its composition as circumstances or the peculiar nature of the lead or its alloy composing such articles show to be expedient.

The coating action of the acid solution of tin may be enhanced by agitating the lead articles in it; and whenever the nature of the articles admit of agitation in a tumbling-barrel the articles may be changed into such a machine with the said solution.

The coating solution may be applied cold or hot to the articles, or it may be heated while the articles are steeped or agitated in it. In the latter case the most convenient mode of heating the solution is by steam introduced into it through a pipe.

The invention is not restricted to the precise ingredients or proportions thereof hereinbefore given, as the ingredients and proportions may be varied to suit the composition of the articles to be plated, articles made of alloys of lead with arsenic requiring more acid in the solution than those made of pure lead, and the proportions of the materials above given being sufficient for treating shot containing the customary proportion of arsenic.

The essential characteristics of the invention are that the solution, when applied to the articles, shall contain a soluble salt of tin and free nitric acid, or some substitute therefor, that will prevent the precipitation of lead salts. Hydrochloric acid is such substitute when a salt of an alkaline base is present; and in place of the nitric acid above mentioned a suitable quantity of nitro-muriatic acid may be used.

We claim as our invention—

The improvement in the art of coating lead articles with tin, consisting of the treatment of the said articles with the solution of a salt of tin and free nitric acid or its substitute, substantially as before set forth, whereby the precipitation of salts of lead is prevented during the plating operation.

Witness our hands this 7th day of March, A. D. 1878.

JOHN JEREMIAH CROOKE.
LEWIS CROOKE.

Witnesses:
C. T. BRUEN,
JOHN M. HARRINGTON.